United States Patent
Li et al.

(10) Patent No.: US 10,419,935 B2
(45) Date of Patent: Sep. 17, 2019

(54) ACCESS METHOD IN WIRELESS COMMUNICATIONS NETWORK, RELATED APPARATUS, AND SYSTEM

(71) Applicant: HUAWEI TECHNOLOGIES CO., LTD., Shenzhen, Guangdong (CN)

(72) Inventors: Huan Li, Shanghai (CN); Youyang Yu, Shanghai (CN); Weisheng Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 46 days.

(21) Appl. No.: 15/722,140

(22) Filed: Oct. 2, 2017

(65) Prior Publication Data

US 2018/0027414 A1 Jan. 25, 2018

Related U.S. Application Data

(63) Continuation of application No. PCT/CN2015/075897, filed on Apr. 3, 2015.

(51) Int. Cl.
*H04W 12/08* (2009.01)
*H04W 12/06* (2009.01)
(Continued)

(52) U.S. Cl.
CPC .......... *H04W 12/08* (2013.01); *H04W 8/06* (2013.01); *H04W 12/06* (2013.01); *H04W 48/08* (2013.01);
(Continued)

(58) Field of Classification Search
CPC ....... H04W 12/06; H04W 12/08; H04W 8/06; H04W 88/182; H04W 48/08; H04W 48/17; H04L 63/08
See application file for complete search history.

(56) References Cited

U.S. PATENT DOCUMENTS 8,625,617 B2 * 1/2014 Shi .................. H04W 8/02
370/401
8,787,318 B2 7/2014 Pampu et al.
(Continued)

FOREIGN PATENT DOCUMENTS

CN  101516083 A  8/2009
CN  101909274 A  12/2010
(Continued)

OTHER PUBLICATIONS

Notification of violation of the requirement of unity, dated Aug. 29, 2018, in Russian Application No. 2017134503 (12 pp.).
(Continued)

*Primary Examiner* — Mehmood B. Khan
(74) *Attorney, Agent, or Firm* — Kilpatrick Townsend & Stockton, LLP

(57) ABSTRACT

An embodiment of the present invention provides an access method in a wireless communications network. Authentication and authorization functions of a 3GPP AAA server for a non-3GPP access network can be integrated into a mobility management network element. Therefore, after UE accesses the non-3GPP access network, a non-3GPP access gateway may select the mobility management network element that supports the authentication and authorization functions for the non-3GPP access network as a target mobility management network element, and request the target mobility management network element to perform authentication and authorization for the UE. After authentication and authorization are performed for the UE, the non-3GPP access gateway may select a P-GW for the UE, and set up a PDN connection between the non-3GPP access gateway and the selected P-GW for the UE.

9 Claims, 10 Drawing Sheets

(51) Int. Cl.
  *H04W 48/08* (2009.01)
  *H04W 88/18* (2009.01)
  *H04W 8/06* (2009.01)
  *H04L 29/06* (2006.01)
  *H04W 48/00* (2009.01)

(52) U.S. Cl.
  CPC ........... *H04W 88/182* (2013.01); *H04L 63/08* (2013.01); *H04W 48/17* (2013.01)

(56) References Cited

U.S. PATENT DOCUMENTS

| | | | |
|---|---|---|---|
| 2011/0035787 A1 | 2/2011 | Naslund et al. | |
| 2011/0099604 A1* | 4/2011 | Zhou | H04L 12/14 726/1 |
| 2011/0164566 A1 | 7/2011 | Xiong | |
| 2012/0084449 A1* | 4/2012 | Delos Reyes | H04L 61/1511 709/229 |
| 2012/0142311 A1* | 6/2012 | Rui | H04L 12/1407 455/406 |
| 2013/0078998 A1* | 3/2013 | Rui | H04L 63/20 455/426.1 |
| 2013/0094487 A1* | 4/2013 | Rui | H04M 15/66 370/338 |
| 2014/0050132 A1 | 2/2014 | Ronneke et al. | |
| 2014/0378131 A1* | 12/2014 | Rui | H04L 41/0893 455/433 |
| 2017/0332296 A1* | 11/2017 | Nilsson | H04W 36/36 |

FOREIGN PATENT DOCUMENTS

| | | |
|---|---|---|
| CN | 103313239 A | 9/2013 |
| EP | 2007162 A2 | 12/2008 |
| KR | 1020110020309 A | 3/2011 |
| KR | 1020140073862 A | 6/2014 |
| RU | 2488978 C2 | 7/2013 |
| WO | 2010012241 A1 | 2/2010 |

OTHER PUBLICATIONS $3^{rd}$ *Generation Partnership Project; Technical Specification Group Services and System Aspects; Architecture enhancements for non-3GPP accesses (Release 13)*, 3GPP TS 23.402 V13.1.0 (Mar. 2015), pp. 1-292.
Partial Supplementary European Search Report, dated Jan. 31, 2018, in European Application No. 15886982.6 (9 pp.).
International Search Report dated Jan. 6, 2016 in corresponding International Patent Application No. PCT/CN2015/075897.
International Search Report dated Jan. 1, 2016 in corresponding International Patent Application No. PCT/CN2015/075897, 6 pp.
3GPP TS 33.402 V12.5.0, "3rd Generation Partnership Project; Technical Specification Group Services and System Aspects; 3GPP System Architecture Evolution (SAE);Security aspects of non-3GPP accesses(Release 12)", Dec. 2014, 56 pp.
3GPP TS 29.273 V12.7.0, "3rd Generation Partnership Project; Technical Specification Group Core Network and Terminals; Evolved Packet System (EPS); 3GPP EPS AAA interfaces (Release 12)", Mar. 2015, 162 pp.
Office Action, dated Sep. 17, 2018, in Korean Application No. 1020177031204 (2 pp.).

* cited by examiner

ACCESS METHOD IN WIRELESS COMMUNICATIONS NETWORK, RELATED APPARATUS, AND SYSTEM

CROSS-REFERENCE TO RELATED APPLICATIONS

This application is a continuation of International Application No. PCT/CN2015/075897, filed on Apr. 3, 2015, the disclosure of which is hereby incorporated by reference in its entirety.

TECHNICAL FIELD

The present invention relates to the field of communications technologies, and specifically, to an access method in a wireless communications network, a related apparatus, and a system.

BACKGROUND

To meet challenges of wireless broadband technologies and maintain leading advantages of 3rd Generation Partnership Project (3GPP) networks, the 3GPP formulated a Long Term Evolution (LTE) plan for a mobile communications network at the end of 2004, and defined a new mobile communications network architecture under guidance of the evolution plan, as shown in FIG. 1. This architecture is more flattened than a second generation (2G) network and a third generation (3G) network, and retains only a packet switched (PS) domain. Therefore, this PS domain may be referred to as an evolved 3GPP packet switched domain (Evolved 3GPP Packet Switched Domain), or may be referred to as an evolved packet system (EPS).

A core network of the new mobile communications network, namely, an evolved packet core network (EPC), not only supports a 3GPP access technology, but also supports a non-3GPP (Non 3GPP) access technology, such as Code Division Multiple Access 2000 (CDMA2000), Worldwide Interoperability for Microwave Access (WiMAX), and a wireless local area network (WLAN).

In the existing network architecture (as shown in FIG. 1), when user equipment (UE) accesses the EPC from a non-3GPP side, the UE may perform access from a trusted non-3GPP side, or may perform access from an untrusted 3GPP side. Using access of UE from an untrusted 3GPP side (for example, access of UE from an untrusted WLAN) as an example, an evolved packet data gateway (ePDG) selects a packet data network gateway (P-GW) for an APN of the UE, and initiates a packet data network (PDN) connection setup procedure to the selected P-GW; through an S6b interface between the P-GW and a 3GPP authentication, authorization, and accounting server (3GPP Authentication, Authorization, and Accounting Server, 3GPP AAA Server), the P-GW sends an identity of the P-GW (namely, a P-GW ID) to the 3GPP AAA server; and then the 3GPP AAA server registers the received P-GW identity with a home subscriber server (home subscriber server/system, HSS). In this way, access from the untrusted 3GPP side is implemented.

However, in the prior art, the 3GPP AAA server needs to participate in the process of accessing the EPC network from the non-3GPP side by the UE. However, during subsequent network deployment, an operator hopes to simplify the network architecture as much as possible. For example, the 3GPP AAA server does not need to be deployed separately, and therefore, several 3GPP AAA related interfaces are not required. In this case, access of the UE from the non-3GPP side cannot be implemented based on the existing solution. This severely affects user experience.

SUMMARY

To resolve the foregoing problem in the prior art, embodiments of the present invention provide an access method in a wireless communications network, a related apparatus, and a system, to adapt to a new simplified network architecture and implement access of UE from a non-3GPP network to an EPC network.

According to a first aspect, an embodiment of the present invention provides an access method in a wireless communications network, including:

after user equipment UE accesses a non 3rd Generation Partnership Project 3GPP access network, selecting, by a non-3GPP access gateway, a target mobility management network element for the UE, where the target mobility management network element supports authentication and authorization functions for the non-3GPP access network;

sending, by the non-3GPP access gateway, an authentication and authorization request message to the target mobility management network element, where the authentication and authorization request message is used to request to perform authentication and authorization for the UE;

after the target mobility management network element successfully performs authentication and authorization for the UE, selecting, by the non-3GPP access gateway, a packet data network gateway P-GW for an access point name APN of the UE;

setting up, by the non-3GPP access gateway, a packet data network PDN connection between the non-3GPP access gateway and the selected P-GW for the APN of the UE; and registering, by the non-3GPP access gateway, an identity of the selected P-GW with a home subscriber server HSS by using the target mobility management network element.

With reference to the first aspect, in a first possible implementation, before the selecting, by the non-3GPP access gateway, a packet data network gateway P-GW for an access point name APN of the UE, the method further includes:

determining, by the non-3GPP access gateway, the APN of the UE.

With reference to the first aspect or the first possible implementation of the first aspect, in a second possible implementation, the registering, by the non-3GPP access gateway by using the target mobility management network element, an identity of the selected P-GW with an HSS includes:

sending, by the non-3GPP access gateway, the APN of the UE and the identity of the selected P-GW to the target mobility management network element, so that the target mobility management network element sends the APN of the UE and the identity of the selected P-GW to the HSS by using a notification message or a non-3GPP Internet Protocol IP access registration request message.

According to a second aspect, an embodiment of the present invention provides an access method in a wireless communications network, including:

after user equipment UE accesses a non 3rd Generation Partnership Project 3GPP access network, receiving, by a mobility management network element that supports authentication and authorization functions for the non-3GPP access network, an authentication and authorization request message sent by a non-3GPP access gateway, where the authentication and authorization request message is used to request to perform authentication and authorization for the UE;

performing, by the mobility management network element, authentication and authorization for the UE according to the authentication and authorization request message;

after successfully performing authentication and authorization for the UE, receiving, by the mobility management network element, an access point name APN of the UE and an identity of a packet data network gateway P-GW that are sent by the non-3GPP access gateway, where the P-GW is selected by the non-3GPP access gateway for the APN of the UE; and sending, by the mobility management network element, the APN of the UE and the identity of the selected P-GW to the HSS.

According to a third aspect, an embodiment of the present invention provides a method for updating subscription data, where the method includes: receiving, by a mobility management network element, a data update request message sent by a home subscriber server HSS after subscription data of user equipment UE is updated, where the data update request message includes an international mobile subscriber identity IMSI of the UE, updated subscription data of the UE, and an access type corresponding to the updated subscription data, and the data update request message is an insert subscription data message, a push subscription request message, or an insert subscriber data message;

determining, by the mobility management network element according to the data update request message, a target gateway corresponding to the access type; and sending, by the mobility management network element, an update message to the target gateway, where the update message is used to request the target gateway to update the subscription data of the UE, and the update message includes the updated subscription data of the UE and the IMSI of the UE.

According to a fourth aspect, an embodiment of the present invention provides a method for updating subscription data, where the method includes:

after subscription data of user equipment UE is updated, sending, by a home subscriber server HSS, a data update request message to a mobility management network element, where the data update request message includes an international mobile subscriber identity IMSI of the UE, updated subscription data of the UE, and an access type corresponding to the updated subscription data, so that the mobility management network element determines, according to the data update request message, a target gateway corresponding to the access type, and sends an update message to the target gateway, where the update message is used to request the target gateway to update the subscription data of the UE, and the update message includes the updated subscription data of the UE and the IMSI of the UE; where the data update request message is an insert subscription data message, a push subscription request message, or an insert subscriber data message.

With reference to the third aspect or the third aspect, in a first possible implementation, when the access type belongs to a non 3rd Generation Partnership Project 3GPP access technology, the target gateway is an evolved packet data gateway ePDG, a trusted wireless local area network access network TWAN, or a high rate packet data serving gateway HSGW, and the update message sent by the mobility management network element to the target gateway is a user subscription data update message; or when the access type belongs to a 3GPP access technology, the target gateway is an S-GW, and the update message sent by the mobility management network element to the target gateway is a modify bearer command.

According to a fifth aspect, an embodiment of the present invention provides a method for updating subscription data, where the method includes:

receiving, by a mobility management network element that supports authentication and authorization functions for a non 3rd Generation Partnership Project 3GPP access network, a data update request message sent by a home subscriber server HSS after subscription data of user equipment UE is updated, where the data update request message includes an international mobile subscriber identity IMSI of the UE and updated subscription data of the UE, and the data update request message is an insert subscription data message, a push subscription request message, or an insert subscriber data message; and sending, by the mobility management network element according to the data update request message, a modify bearer command to an S-GW connected to the mobility management network element and a user subscription data update message to all non-3GPP access gateways connected to the mobility management network element, where both the modify bearer command and the user subscription data update message include the updated subscription data of the UE and the IMSI of the UE.

An embodiment of the present invention provides an access method in a wireless communications network. Authentication and authorization functions of a 3GPP AAA server for a non-3GPP access network can be integrated into a mobility management network element. Therefore, after UE accesses the non-3GPP access network, a non-3GPP access gateway may select the mobility management network element that supports the authentication and authorization functions for the non-3GPP access network as a target mobility management network element, and request the target mobility management network element to perform authentication and authorization for the UE. After authentication and authorization are performed for the UE, the non-3GPP access gateway may select a P-GW for the UE, and set up a PDN connection between the non-3GPP access gateway and the selected P-GW for the UE. In this way, access of the UE from the non-3GPP access network to an EPC network is implemented.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

Embodiments of the present invention provide an access method in a wireless communications network to implement access of UE from a non-3GPP network based on a simplified network architecture. The embodiments of the present invention further provide a corresponding device and a system.

Figure 1:
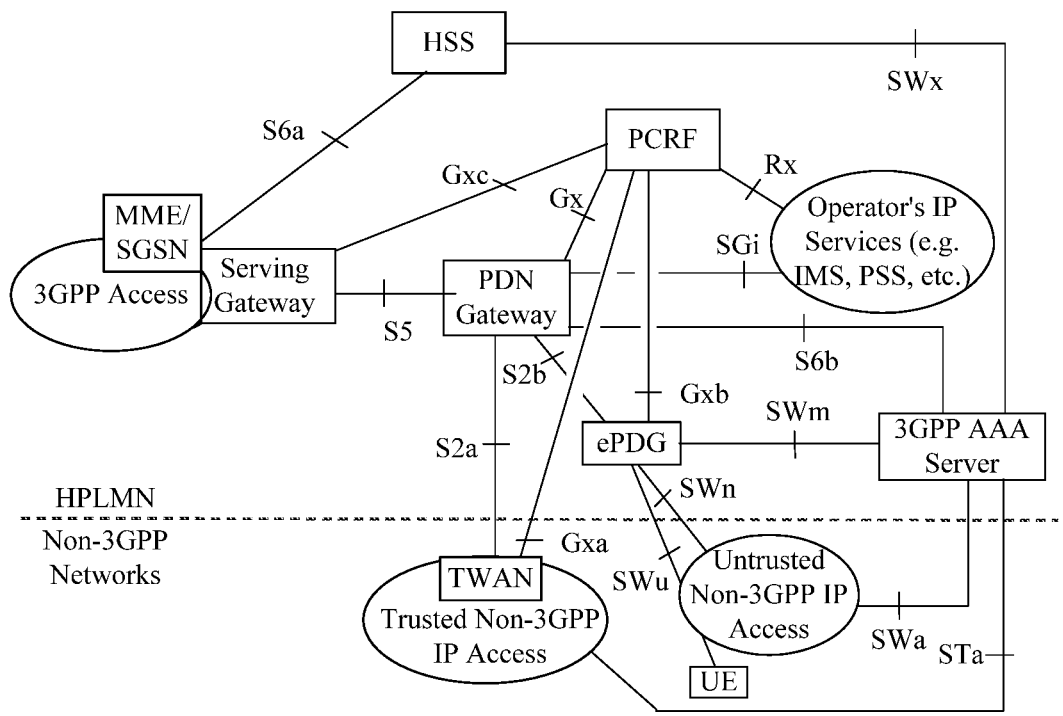
FIG. 1 is a schematic architecture diagram of an evolved packet system.

As shown in FIG. 1, in an existing network architecture, a core network EPC mainly includes a mobility management entity (MME), a serving general packet radio system (GPRS) support node (SGSN), a serving gateway (S-GW), and a P-GW. The MME is mainly responsible for non-access stratum (NAS) signaling with user equipment, allocating a temporary identity to the user equipment, and selecting network elements in the core network, such as the S-GW and the P-GW, for the user equipment for 3GPP access. The S-GW is a local mobility anchor for an inter-eNodeB handover, and provides lawful interception related functions. The P-GW is mainly responsible for user address allocation, enforcement of policy and charging control rules, and lawful interception related functions.

When the UE accesses the EPC from a non-3GPP network, the UE may perform access by using an interface between a trusted non-3GPP access network and the P-GW, for example, perform access by using an S2a interface between a trusted WLAN access network (TWAN) and the P-GW, or may perform access by using an interface between an untrusted non-3GPP access network and the P-GW, for example, perform access by using an S2b interface between an ePDG and the P-GW. The ePDG/TWAN is mainly responsible for forwarding a mobile IP address of the UE allocated by the P-GW, registering a local IP address of the UE, and binding the mobile IP address of the UE with the local IP address. When access is performed from a non-3GPP network, there is another important network element, a 3GPP AAA server. The 3GPP AAA server is mainly responsible for implementing authentication and authorization operations for the UE by interacting with an HSS, and registering, with the HSS, a P-GW identity used for each PDN connection set up by the UE. The HSS is mainly configured to store user subscription information.

During subsequent network deployment, an operator hopes to simplify the network architecture as much as possible. For example, the 3GPP AAA server does not need to be deployed separately; instead, 3GPP AAA functions are integrated into an existing network element, so that several 3GPP AAA related interfaces are not required. In this case, the prior art cannot be used to implement access of the UE from a non-3GPP side to the EPC network. In view of this, the embodiments of the present invention provide an access method in a wireless communications network. Some or all logical functions of a 3GPP AAA server can be integrated into a mobility management network element. Therefore, after user equipment UE accesses a non 3rd Generation Partnership Project 3GPP access network, a non-3GPP access gateway, namely, a non-3GPP network access gateway, selects the mobility management network element that supports authentication and authorization functions for the non-3GPP access network to perform authentication and authorization for the UE. After a PDN connection is set up, the target mobility management network element registers an identity of the selected P-GW with a home subscriber server HSS. In this way, access of the UE from the non-3GPP network to an EPC network is implemented.

In addition, in the prior art, when user subscription data is updated, the HSS needs to update updated subscription data to a corresponding gateway. Specifically, if subscription data of UE that performs access from a 3GPP network is updated, the HSS needs to notify the MME/SGSN, and the MME/SGSN updates updated subscription data to the S-GW; if subscription data of UE that performs access from a non-3GPP network is updated, the HSS needs to notify the 3GPP AAA server, and the 3GPP AAA server updates updated subscription data to a non-3GPP access gateway, for example, an ePDG or a TWAN or a high rate packet data (HRPD) serving gateway (HSGW). However, based on an architecture put forward in the embodiments of the present invention in which a 3GPP AAA server is integrated with an MME, updating of user subscription data cannot be implemented according to the solution in the prior art. Therefore, to resolve the problem, the embodiments of the present invention further provide a method for updating subscription data, a related apparatus, and a system.

In the embodiments of the present invention, the mobility management network element may be an MME, or may be an SGSN (such as a GnGp-SGSN or an S4-SGSN); the non-3GPP access gateway (namely, a non-3GPP network access gateway, hereinafter abbreviated to a non-3GPP access gateway for ease of description) may be an ePDG, or may be a TWAN, or may be an HSGW. This is not limited in the embodiments of the present invention.

Figure 2A:
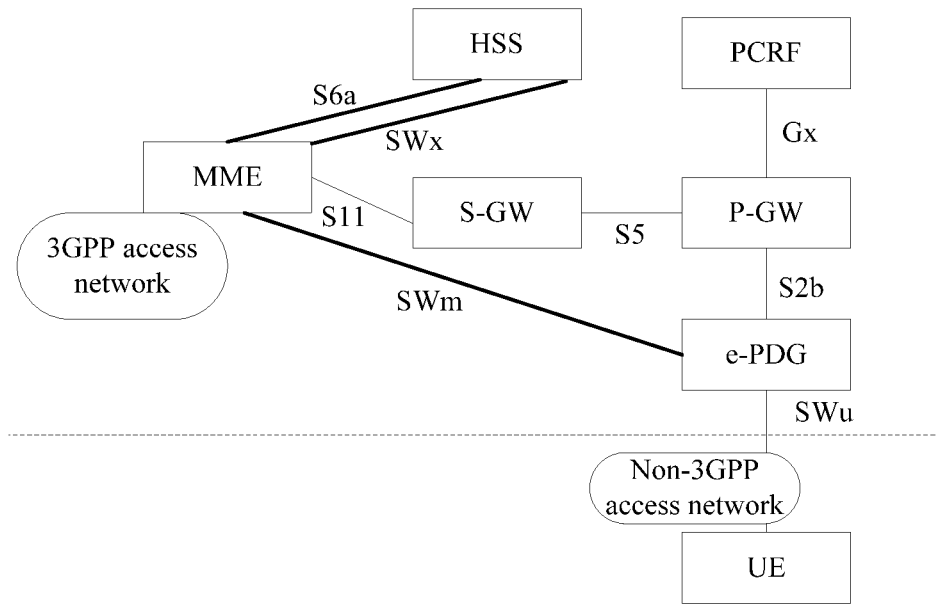
FIG. 2(a) is a schematic diagram of an architecture in which a 3GPP AAA server is integrated with an MME according to an embodiment of the present invention.
Figure 2B:
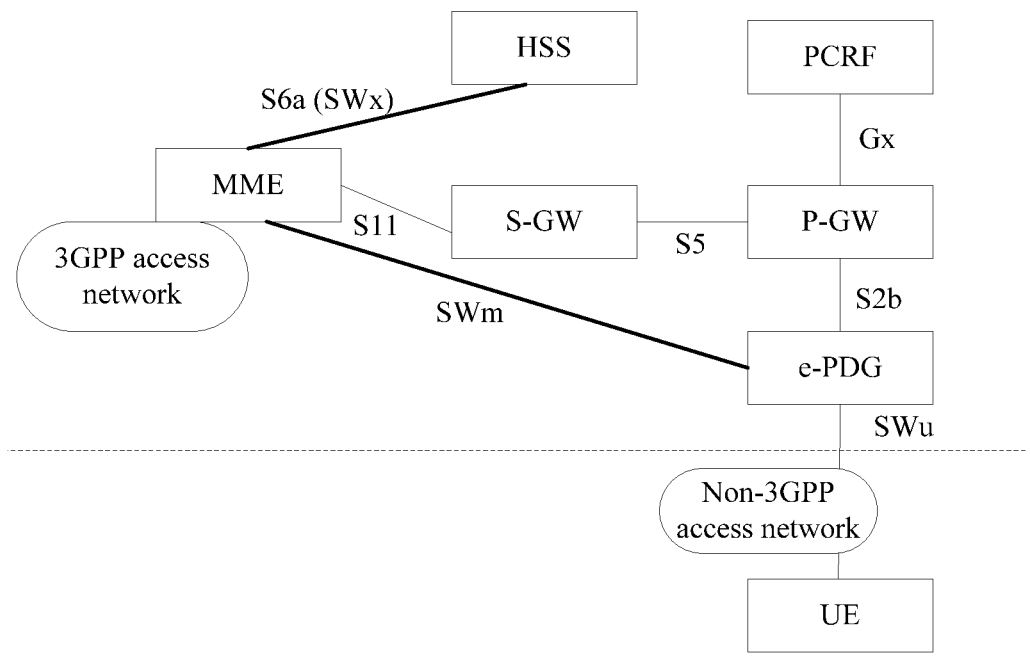
FIG. 2(b) is a schematic diagram of another architecture in which a 3GPP AAA server is integrated with an MME according to an embodiment of the present invention.

In the embodiments of the present invention, for example, the mobility management network element is an MME, and the non-3GPP access gateway is an ePDG. An architecture diagram in which the 3GPP AAA server is integrated with the MME is provided, as shown in FIG. 2(a) and FIG. 2(b). Logical functions of the 3GPP AAA server are deployed on the MME, and an independent SWx interface is added between the MME and the HSS, as shown in FIG. 2(a); or an S6a interface between the MME and the HSS is upgraded to support an SWx interface between the 3GPP AAA server and the HSS, as shown in FIG. 2(b). However, an SWm interface between the ePDG and the 3GPP AAA server may be deployed between the MME and the ePDG an S6b interface between the ePDG and the 3GPP AAA server is no longer deployed, and an SWa interface between the 3GPP AAA server and an untrusted 3GPP access network may also be no longer deployed. The network architecture is simplified greatly.

Likewise, the MME may also be replaced with an SGSN, that is, the logical functions of the 3GPP AAA server are deployed on the SGSN. Correspondingly, the S6a interface between the MME and the HSS is replaced with an S6d interface or a Gr interface (if the MAP protocol is supported) between the SGSN and the HSS, and an S11 interface between the MME and the S-GW is replaced with an S4 interface between the SGSN and the S-GW. This is not shown in the figure.

Optionally, the ePDG may also be replaced with a TWAN or an HSGW. Correspondingly, the SWm interface between the ePDG and the MME/SGSN is replaced with an STa interface between the TWAG/HSGW and the MME/SGSN, and an S2b interface between the ePDG and the P-GW is replaced with an S2a interface between the TWAN/HSGW and the P-GW. This is not shown in the figure. In this case, an S6b interface between the TWAN/HSGW and the 3GPP AAA server is no longer deployed, and an SWa interface between the 3GPP AAA server and a trusted 3GPP access network is also no longer deployed. The network architecture is simplified greatly.

The following clearly and completely describes the technical solutions in the embodiments of the present invention with reference to the accompanying drawings in the embodiments of the present invention.

Figure 3:
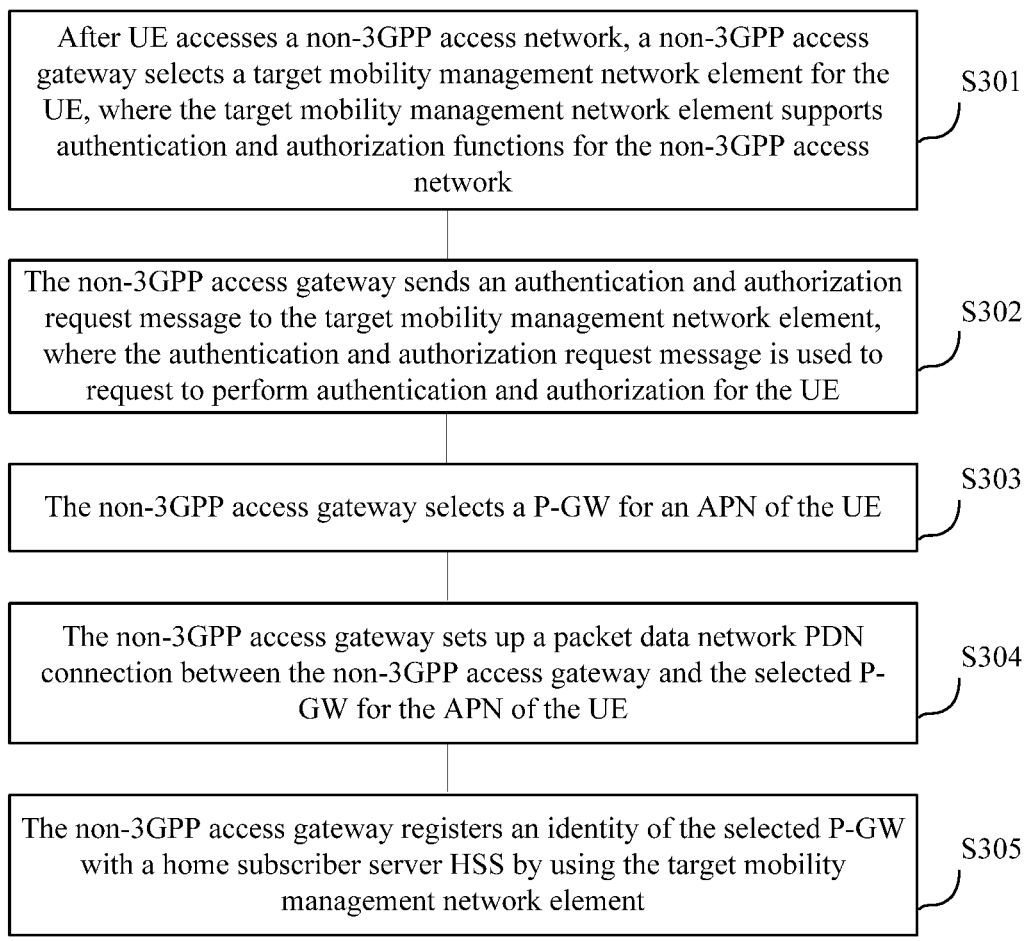
FIG. 3 is a flowchart of an access method in a wireless communications network according to an embodiment of the present invention.

As shown in FIG. 3, an embodiment of the present invention provides an access method in a wireless communications network. Authentication and authorization functions of a 3GPP AAA server for a non-3GPP access network can be integrated into a mobility management network element, so that access of UE from a non-3GPP network to an EPC network is implemented. The specific method is as follows:

S301. After UE accesses a non-3GPP access network, a non-3GPP access gateway selects a target mobility management network element for the UE, where the target mobility management network element supports authentication and authorization functions for the non-3GPP access network.

The target mobility management network element is a mobility management network element in the foregoing integrated architecture, and integrates authentication and authorization functions of a 3GPP AAA server for the non-3GPP access network. For example, when the non-3GPP access network is a WALN, the target mobility management network element supports authentication and authorization functions for the WALN, and can perform authentication and authorization for the UE that performs access from the WALN.

In each embodiment of the present invention, that the mobility management network element supports authentication and authorization functions for the non-3GPP access network means that the mobility management network element can perform authentication and authorization for the UE that performs access from the non-3GPP access network (such as the WLAN, CDMA2000, or WiMAX).

S302. The non-3GPP access gateway sends an authentication and authorization request (Authentication and Authorization Request) message to the target mobility management network element, where the authentication and authorization request message is used to request to perform authentication and authorization for the UE.

After the UE accesses the non-3GPP access network, the non-3GPP access gateway may request to perform authentication and authorization for the UE, for example, send the authentication and authorization request message through an SWm interface or an STa interface added between the non-3GPP access gateway and the mobility management network element.

The target mobility management network element may perform authentication and authorization for the UE according to the authentication and authorization request message. Specifically, for example, subscription data of the UE may be obtained from an HSS, and authorization is performed for the UE according to the subscription data of the UE. The target mobility management network element may further obtain an authentication vector of the UE from the HSS, and perform authentication by using the authentication vector of the UE. The authentication may include authentication performed by a network side (namely, the target mobility management network element) for the UE and authentication performed by the UE for the network side, or may include only authentication performed by a network side for the UE. This is not limited herein in this embodiment of the present invention. After the target mobility management network element successfully performs authentication and authorization for the UE, the target mobility management network element may return an authentication and authorization success message to the UE. The foregoing authentication and authorization procedure is similar to an authentication and authorization procedure performed by a 3GPP AAA server for UE in the prior art. Details are not described herein in this embodiment of the present invention.

It should be noted that, in each embodiment of the present invention, if the UE has accessed a 3GPP access network before accessing the non-3GPP access network, and an authentication procedure is performed and authentication is successful, that the target mobility management network element performs authentication and authorization for the UE may mean that only authorization is performed for the UE but authentication is not performed for the UE again.

S303. The non-3GPP access gateway selects a P-GW for an APN of the UE.

After the target mobility management network element successfully performs authentication and authorization for the UE, the non-3GPP access gateway may select the P-GW for the APN of the UE.

Before selecting the P-GW for the APN of the UE, the non-3GPP access gateway may further determine the APN of the UE. For a manner of determining the APN of the UE and selecting the P-GW for the APN, refer to a manner described in a next embodiment. The manner is not limited herein in this embodiment of the present invention.

S304. The non-3GPP access gateway sets up a PDN connection between the non-3GPP access gateway and the selected P-GW for the APN of the UE.

S305. The non-3GPP access gateway registers an identity of the selected P-GW with an HSS by using the target mobility management network element.

The non-3GPP access gateway may send the APN of the UE and the identity of the selected P-GW to the target mobility management network element, so that the target mobility management network element sends the APN of the UE and the identity of the selected P-GW to the HSS by using a notification message (Notify Request) or a non-3GPP IP access registration request (Non-3GPP IP Access Registration request) message. In this way, registration of the identity of the P-GW is implemented, and access of the UE from the non-3GPP access network to an EPC network is implemented.

In this embodiment of the present invention, authentication and authorization functions of a 3GPP AAA server for a non-3GPP access network are integrated into a mobility management network element. Therefore, after UE accesses the non-3GPP access network, a non-3GPP access gateway may select the mobility management network element that supports the authentication and authorization functions for the non-3GPP access network as a target mobility management network element, and request the target mobility management network element to perform authentication and authorization for the UE. After authentication and authorization are performed for the UE, the non-3GPP access gateway may select a P-GW for the UE, and set up a PDN connection between the non-3GPP access gateway and the selected P-GW for the UE. In this way, access of the UE from the non-3GPP access network to an EPC network is implemented.

Optionally, in S301, the target mobility management network element may be determined in multiple manners. For example, the non-3GPP access gateway selects the target mobility management network element according to preconfigured information, where the preconfigured information includes a correspondence between location information of the UE and an identity of the target mobility management network element, or the preconfigured information includes a correspondence between an identity of the non-3GPP access gateway and an identity of the target mobility management network element; or the non-3GPP access gateway sends an international mobile subscriber identity (IMSI) of the UE to a routing agent node (DRA), so that the DRA selects the target mobility management network element for the UE according to the IMSI of the UE; or the non-3GPP access gateway constructs a fully qualified domain name (FQDN) of a mobility management network element according to location information of the UE, sends the FQDN to a domain name resolution server (DNS), so that the DNS can determine mobility management network elements according to the fully qualified domain, receives identities of the mobility management network elements determined by the DNS according to the FQDN, and selects, from the mobility management network elements determined by the DNS, a mobility management network element that supports the authentication and authorization functions for the non-3GPP access network, as the target mobility management network element; because the mobility management network element is determined according to the fully qualified domain name constructed according to the location information of the UE, a location of the selected target mobility management network element may be close to the UE.

It should be noted that, in the foregoing embodiment, when the target mobility management network element interacts with the HSS, a 3GPP interface between the mobility management network element and the HSS in the existing architecture may be used. For example, the S6a interface in FIG. 2(b) is used. In this case, the HSS may be unaware of a change of a network element architecture, and the HSS also does not need to be improved. Alternatively, a new non-3GPP interface between the mobility management network element and the HSS in the integrated architecture may be used. For example, the SWx interface in FIG. 2(a) is used. In this case, the HSS may be aware of a change of a network element architecture.

Because in this embodiment of the present invention, both UE that performs access from a 3GPP network and UE that performs access from a non-3GPP network need to interact with the HSS by using the mobility management network element, it is difficult for the HSS to determine whether the exchanged information such as the identity of the P-GW and the APN comes from the UE that performs access from the 3GPP network or the UE that performs access from the non-3GPP network. Therefore, in this embodiment of the present invention, the non-3GPP access gateway may further determine an access type (RAT type) of the UE, where the access type of the UE may be used to indicate an access technology used by the UE to perform access. For example, when the UE performs access from a wireless local area network (WLAN), the access type information may be set as the WLAN, or a trusted WLAN, or an untrusted WLAN, or the like. The non-3GPP access gateway may send the access type of the UE and the APN of the UE together with the identity of the selected P-GW to the target mobility management network element, so that the target mobility management network element sends the APN of the UE, the identity of the selected P-GW, and the access type of the UE to the HSS. Therefore, the HSS may store the APN of the UE, the identity of the selected P-GW, and the access type of the UE, and correspondences between them. In addition, the non-3GPP access gateway may not determine the access type of the UE, but the mobility management network element directly determines the access type of the UE. This is not limited herein in this embodiment of the present invention.

Figure 4:
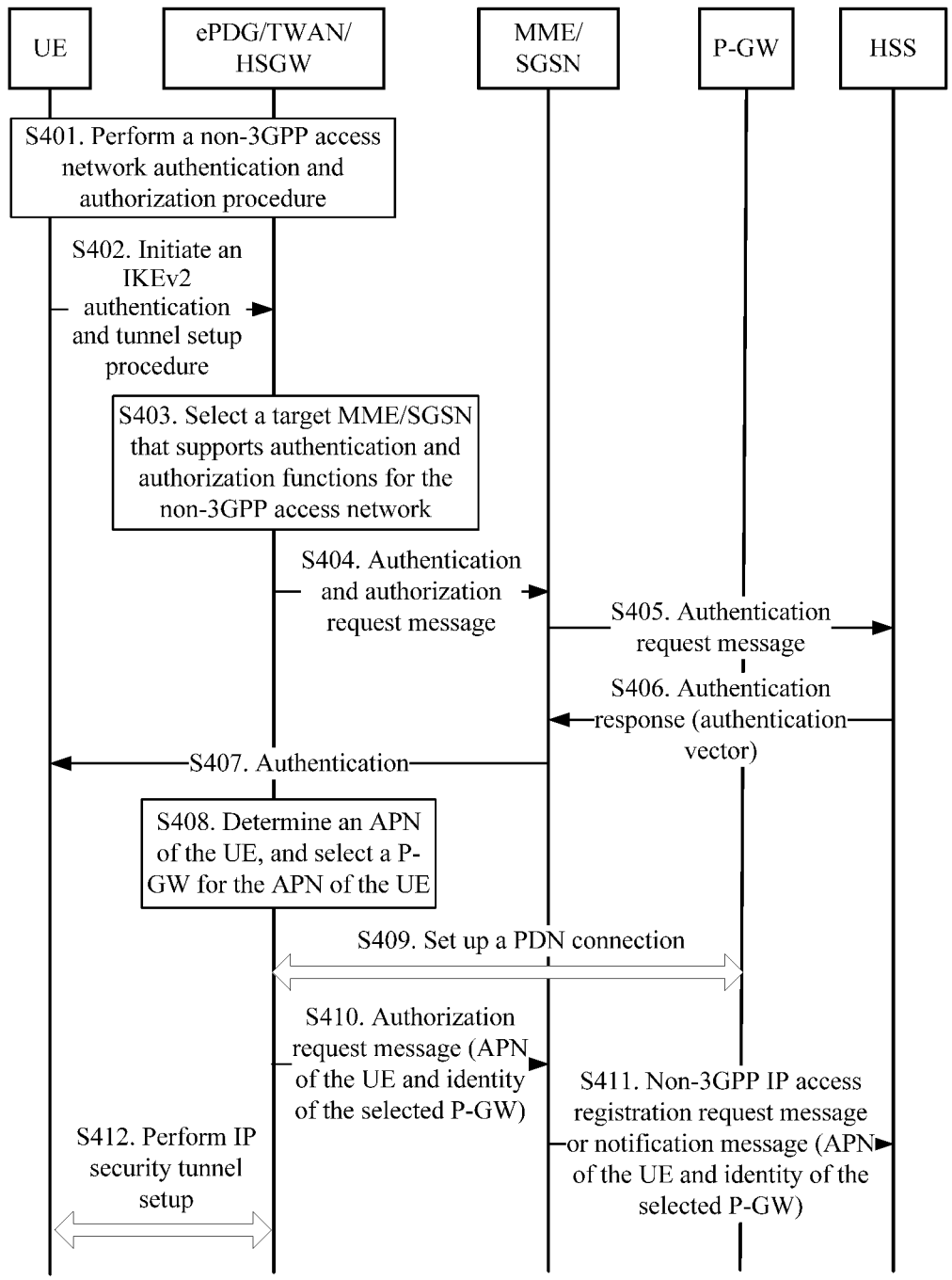
FIG. 4 is a flowchart of another access method in a wireless communications network according to an embodiment of the present invention.

The following uses an example in which a mobility management network element is an MME and a non-3GPP access gateway is an ePDG for description. When the mobility management network element is an SGSN or the non-3GPP access gateway is a TWAN or an HSGW, also refer to the following method to perform an access procedure of UE from a non-3GPP side. Details are not described again herein in this embodiment of the present invention. With reference to the network architecture shown in FIG. 2(a), an embodiment of the present invention provides a method for selecting a P-GW, as shown in FIG. 4.

S401. After UE accesses a WLAN access network, the UE performs a WLAN access network authentication and authorization procedure.

After the UE accesses the WLAN access network, the UE may perform signaling interaction with a WLAN access gateway ePDG, and perform the WLAN access network authentication and authorization procedure. S401 is an optional step.

S402. The UE initiates an IKEv2 authentication and tunnel setup (Internet Key Exchange Version 2 Authentication and Tunnel Setup, IKEv2 Authentication and Tunnel Setup) procedure to an ePDG After the UE accesses the WLAN access network, the UE may select the ePDG and initiate the KEv2 authentication and tunnel setup procedure to the ePDG, so as to request to perform authentication for the UE and set up a PDN connection for the UE.

S403. The ePDG selects a target MME that supports authentication and authorization functions for a WLAN.

The ePDG may select, according to preconfigured information, the target MME that supports the authentication and authorization functions for the WLAN, and therefore perform authentication and authorization for the UE. For example, the preconfigured information may include a correspondence between location information and an MME, and the ePDG may determine, according to the location information of the UE, the MME corresponding to the location information of the UE in the preconfigured information, and use the MME as the target MME. Alternatively, an MME corresponding to the ePDG may be specified in the preconfigured information, and the MME corresponding to the ePDG in the preconfigured information is used as the target MME, so that the ePDG may select the same MME for all UEs connected to the ePDG Alternatively, a correspondence between an IMSI and an MME, for example, a correspondence between an IMSI in a range and an MME or a correspondence between an IMSI and an MME used by the IMSI, may be preconfigured in a DRA, so that the ePDG can send the IMSI of the UE to the DRA, and that the DRA determines the target MME for the UE according to the IMSI of the UE.

Alternatively, the ePDG may construct an FQDN according to location information of the UE, send the FQDN to a DNS, receive identities of MMEs determined by the DNS according to the FQDN, and select, from the MMEs determined by the DNS, an MME that supports the authentication and authorization functions for the WLAN, as the target MME, and therefore may select an MME relatively close to the UE as the target MME.

It should be noted that, the target MME supports the authentication and authorization functions for the WLAN.

S404. The ePDG sends an authentication and authorization request message to the target MME, where the authentication and authorization request message is used to request to perform authentication and authorization for the UE.

When the non-3GPP access gateway is not an ePDG for example, is a TWAN or an HSGW, the non-3GPP access gateway may also use the foregoing method to select the target MME, or may perform authentication and authorization for the UE by using the authentication and authorization request message.

S405. The target MME sends an authentication request message (authentication request) to an HSS through an SWx interface, where the authentication request message is used to request to obtain an authentication vector of the UE.

Before S405, the target MME may obtain subscription data of the UE and perform authentication for the UE.

S406. The HSS returns an authentication response message (authentication response) to the MME through the SWx interface, where the authentication response message includes the authentication vector of the UE.

S407. The target MME uses the authentication vector of the UE to perform authentication for the UE.

The foregoing authentication procedure is similar to an authentication and authorization procedure performed by a 3GPP AAA server for UE in the prior art. Details are not described herein in this embodiment of the present invention.

S408. The ePDG determines an APN of the UE, and selects a P-GW for the APN of the UE.

After the foregoing authentication and authorization succeed, the ePDG may determine the APN of the UE. If the UE requests the APN, and the subscription data of the UE includes the APN requested by the UE, the ePDG may use the APN requested by the UE as the APN of the UE. If the UE requests the APN, but the subscription data of the UE does not include the APN requested by the UE, the ePDG may reject the authentication and authorization request. If the UE does not request the APN, the ePDG may use a default APN in the subscription data of the UE as the APN of the UE.

When selecting a P-GW, if the ePDG determines that the UE performs access by performing an initial attach (initial attach) procedure, the ePDG may select the P-GW based on the APN of the UE. For example, the ePDG may send a target APN to a DNS server, the DNS server may return, to the ePDGC a list of P-GWs (PGW list or P-GW list) that can connect to the target APN, and the ePDG may select an appropriate P-GW from the P-GW list. If the ePDG determines that the UE performs access by performing a multiple access (multiple access) procedure or a handover (handover) procedure, the ePDG may use a P-GW corresponding to the APN in the subscription data of the UE as the selected P-GW.

S409. The ePDG sets up a PDN connection between the ePDG and the selected P-GW for the APN of the UE.

S410. The ePDG sends an authorization request message to the target MME, where the authorization request message includes the APN of the UE and an identity of the selected PGW.

In this embodiment of the present invention, a 3GPP AAA sever is no longer deployed, and no interface exists between the P-GW and the target MME. This is different from the solution in which a P-GW registers an identity of the P-GW with an HSS by using a 3GPP AAA sever in the prior art. Therefore, the ePDG may register the identity of the selected P-GW with the HSS by using the target MME. Therefore, it is ensured that the UE uses the same P-GW during a handover between a 3GPP network and a non-3GPP network, and service continuity is ensured.

S411a. The target MME sends a non-3GPP IP access registration request (Non 3GPP Internet Protocol Access Registration request) message to the HSS through the SWx interface, where the non-3GPP IP access registration request message includes the APN of the UE and the identity of the selected PGW, so as to register the identity of the P-GW with the HSS.

In this embodiment of the present invention, the authentication and authorization after the UE performs access from a non-3GPP side, and registration of the P-GW are all performed by using the SWx interface between the MME and the HSS, but signaling interaction after the UE performs access from a 3GPP side is still performed by using an S6a interface between the MME and the HSS, so that the HSS may determine, according to an interface on which a message is received, whether the message comes from the 3GPP network or the non-3GPP network. For example, if the identity of the P-GW and the APN that are sent by the MME are received from the SWx interface, it may be determined that the identity of the P-GW and the APN are used for the UE that performs access from the non-3GPP network; if the identity of the P-GW and the APN that are sent by the MME are received from the S6a interface, it may be determined that the identity of the P-GW and the APN are used for the UE that performs access from the 3GPP network.

Optionally, S411 may also be replaced with:

S411b. The target MME sends a notification message (Notify Request) to the HSS through the S6a interface, where the notification message includes the APN of the UE and the identity of the selected PGW, so as to register the identity of the P-GW with the HSS.

If the method in S411b is used, it indicates that the authentication and authorization after the UE performs access from the non-3GPP side are performed by using the SWx interface between the MME and the HSS, but registration of the P-GW is performed by using the S6a interface between the MME and the HSS. In this case, the HSS cannot determine, according to an interface on which a message is received, whether the message comes from the 3GPP network or the non-3GPP network.

Optionally, the notification message may further include an access type of the UE. The access type is used to indicate an access technology used by the UE to perform access. For example, when the UE performs access from the WLAN, the access type of the UE may be the WLAN, a trusted WLAN, or an untrusted WLAN. Therefore, the HSS may determine, according to the access type, whether the APN of the UE and the identity of the selected PGW are used for the 3GPP network or the non-3GPP network.

It should be noted that, when the mobility management network element is not an MME, for example, is an SGSN, during registration of the identity of the selected PGW, the method in S411 may be used, or the method in S411' may be used. However, when the method in S411' is used, the notification message is transmitted through a 3GPP interface between the mobility management network element and the HSS, for example, an S6d interface or a Gr interface between the SGSN and the HSS.

S412. IP security tunnel setup (IPSec Tunnel Setup) is performed between the UE and the ePDG After the IP security tunnel setup is complete, the ePDG may notify the UE that the IP security tunnel setup is complete, and send an IP address of the PDN connection to the UE.

In the foregoing embodiment, the architecture shown in (a) is used. When the architecture shown in (b) is used, because no SWx interface is added, and only the S6a interface is enhanced, it is only necessary to change the SWx interface used for sending the authentication request message and the authentication response message in S405 and S406 to the S6a interface, and replace S411a with S411b. That is, a notification message is sent to the HSS through the S6a interface to register the identity of the selected P-GW with the HSS. Likewise, the notification message may further include the access type of the UE.

In the foregoing architecture in which the 3GPP AAA server is integrated with the mobility management network element, to implement updating of subscription data of UE, an embodiment of the present invention provides a method for updating subscription data. The method includes the following steps.

S501. A mobility management network element that supports authentication and authorization functions for a non-3GPP access network receives a data update request message sent by an HSS after subscription data of UE is updated, where the data update request message includes an international mobile subscriber identity IMSI of the UE, updated subscription data of the UE, and an access type corresponding to the updated subscription data, and the data update request message is an insert subscription data message (Insert Subscription Data), a push subscription request message (Push Profile Request), or an insert subscriber data message (Insert Subscriber Data).

The HSS stores the subscription data of the UE. Because different subscription data may be used for different access technologies, during updating of the subscription data, the access type corresponding to the updated subscription data also needs to be sent to the mobility management network element, so that the mobility management network element can determine a target gateway according to the access type, and send the updated subscription data to the corresponding target gateway.

S502. The mobility management network element determines, according to the data update request message, a target gateway corresponding to the access type.

When the access type belongs to a non-3GPP access technology, the target gateway is a non-3GPP access gateway, such as an ePDG, a TWAN, or an HSGW. Alternatively, when the access type belongs to a 3GPP access technology, the target gateway is an S-GW.

S503. The mobility management network element sends an update message to the target gateway, where the update message is used to request the target gateway to update the subscription data of the UE, and the update message includes the updated subscription data of the UE and the IMSI of the UE.

When the target gateway is a non-3GPP access gateway, the update message may be a user subscription data update message (User Profile Update). When the target gateway is an S-GW, the update message may be a modify bearer command (Modify Bearer Command).

After the target gateway receives the update message, the target gateway may not only update the subscription data of the UE but also send the updated subscription data of the UE to a corresponding P-GW, so that the P-GW also updates the subscription data of the UE.

Optionally, after receiving the data update request message, the mobility management network element may further send a data update response message to the HSS, where the data update response message includes the access type, and the data update response message is an insert subscription data response message, a push subscription response message, or an insert subscriber data response message.

In this embodiment of the present invention, a mobility management network element may determine a target gateway according to an access type corresponding to updated subscription data of the UE, so that the updated subscription data of the UE is updated to the target gateway and that the updated subscription data of the UE is updated to a P-GW through the target gateway. In this way, updating of user subscription data is implemented, and normal use of the subscription data of the UE is ensured.

Figure 6:
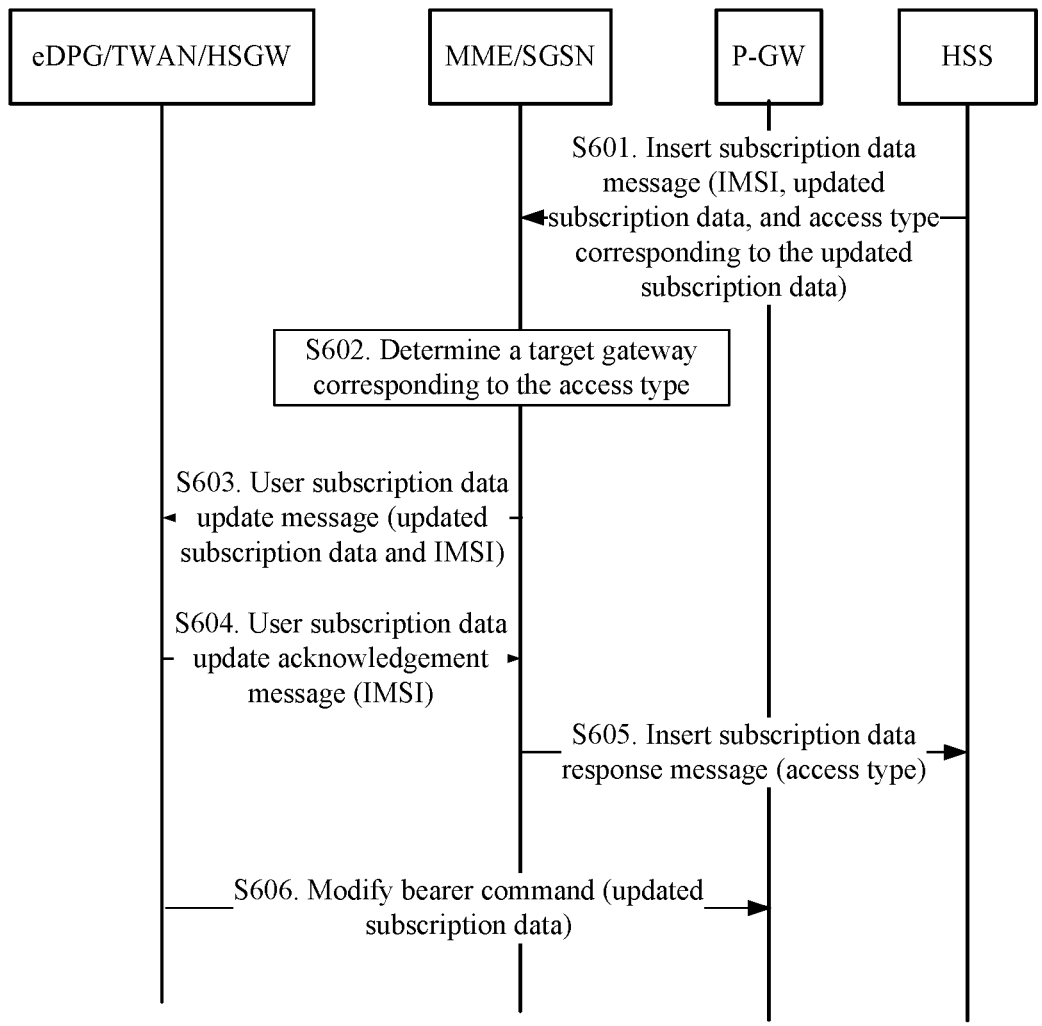
FIG. 6 is a flowchart of another method for updating subscription data according to an embodiment of the present invention.

Using an example in which a mobility management network element is an MME, and a non-3GPP access gateway is an ePDG, the following describes a method for updating subscription data according to an embodiment of the present invention, as shown in FIG. 6. When the mobility management network element is an SGSN or the non-3GPP access gateway is a TWAN or an HSGW, also refer to the following method to update subscription data. Details are not described again herein in this embodiment of the present invention.

S601. An HSS sends an insert subscription data message to an MME, where the insert subscription data message includes an IMSI of the UE, updated subscription data of the UE, and an access type corresponding to the updated subscription data, and the access type is a WLAN.

Because different subscription data may be used for different access technologies, during updating of the subscription data, the access type corresponding to the updated subscription data also needs to be sent to the MME, so that the MME can determine a target gateway according to the access type, and send the updated subscription data to the corresponding target gateway.

The HSS may send the subscription data message through an S6a interface between the HSS and the MME.

Optionally, the HSS may further send, to the MME through an SWx interface by using a push subscription request message, the IMSI of the UE, the updated subscription data of the UE, and the access type corresponding to the updated subscription data.

It should be noted that, if the mobility management network element is an SGSN, the HSS may send, to the SGSN through the SWx interface by using the push subscription request message, the IMSI of the UE, the updated subscription data of the UE, and the access type corresponding to the updated subscription data, or send the foregoing information to the SGSN through an S6d interface or a Gr interface by using an insert subscriber data message.

S602. The MME determines, according to the access type, that a target gateway corresponding to the access type is an ePDG S603. The MME sends a user subscription data update message to the ePDG where the user subscription data update message includes the updated subscription data of the UE and the IMSI of the UE.

It should be noted that, when the target gateway corresponding to the access type is not an ePDG but a TWAN or an HSGW, the MME may also send the updated subscription data of the UE and the IMSI of the UE to the TWAN or the HSGW by using the user subscription data update message.

S604. The ePDG returns a user subscription data update acknowledgement (User Profile Update Ack) message to the MME according to the user subscription data update message.

The user subscription data update acknowledgement message may include the IMSI of the UE.

S605. The MME returns an insert subscription data response (Insert Subscription Data Ack) message to the HSS, where the insert subscription data response message includes the access type.

The insert subscription data response message returned by the MME includes the access type, or may further include the IMSI of the UE, so that the HSS can determine, according to information included in the insert subscription data response message, the insert subscription data message that the response message is intended for, that is, determine which subscription data of which UE is updated successfully.

S606. The ePDG sends a modify bearer command (Modify Bearer Command) to a P-GW, where the modify bearer command includes the updated subscription data, so as to update the updated subscription data to the P-GW.

It should be noted that, there is no sequence relationship between S604 and S606, that is, S604 may be performed first and then S606 is performed, or S606 may be performed first and then S604 is performed.

Figure 7:
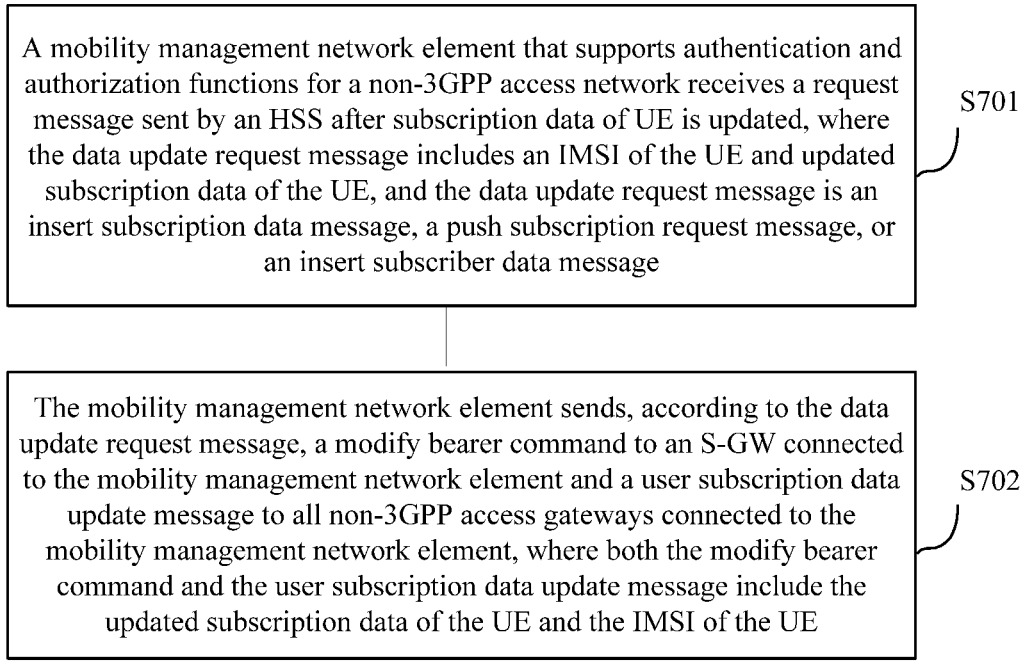
FIG. 7 is a flowchart of another method for updating subscription data according to an embodiment of the present invention.

In the foregoing embodiment, there is corresponding subscription data for different access technologies. However, in some cases, same subscription data may be used for different access technologies, and therefore, when subscription data of UE is updated, the subscription data needs to be updated to a 3GPP network and a non-3GPP network. In view of this, an embodiment of the present invention further provides a method for updating subscription data. As shown in FIG. 7, the method includes the following steps.

S701. A mobility management network element that supports authentication and authorization functions for a non-3GPP access network receives a request message sent by an HSS after subscription data of UE is updated, where the data update request message includes an IMSI of the UE and updated subscription data of the UE, and the data update request message is an insert subscription data message, a push subscription request message, or an insert subscriber data message.

S702. The mobility management network element sends, according to the data update request message, a modify bearer command to an S-GW connected to the mobility management network element and a user subscription data update message to all non-3GPP access gateways connected to the mobility management network element, where both the modify bearer command and the user subscription data update message include the updated subscription data of the UE and the IMSI of the UE.

The S-GW may update the subscription data of the UE according to the modify bearer command, and the S-GW may further update the updated subscription data of the UE to a corresponding P-GW. The non-3GPP access gateway may also update the subscription data of the UE according to the user subscription data update message, or may further update the updated subscription data of the UE to the corresponding P-GW. The non-3GPP access gateway may be an ePDG a TWAN, or an HSGW.

In this embodiment of the present invention, in an integrated architecture, a mobility management network element supports authentication and authorization functions for a non-3GPP access network. Therefore, when subscription data is updated, an HSS may send the subscription data only to the mobility management network element, and the mobility management network element sends the subscription data to an S-GW and all non-3GPP access gateways. Therefore, the S-GW and the non-3GPP access gateways may update the updated subscription data to a corresponding P-GW, and updating of the subscription data is implemented.

Figure 5:
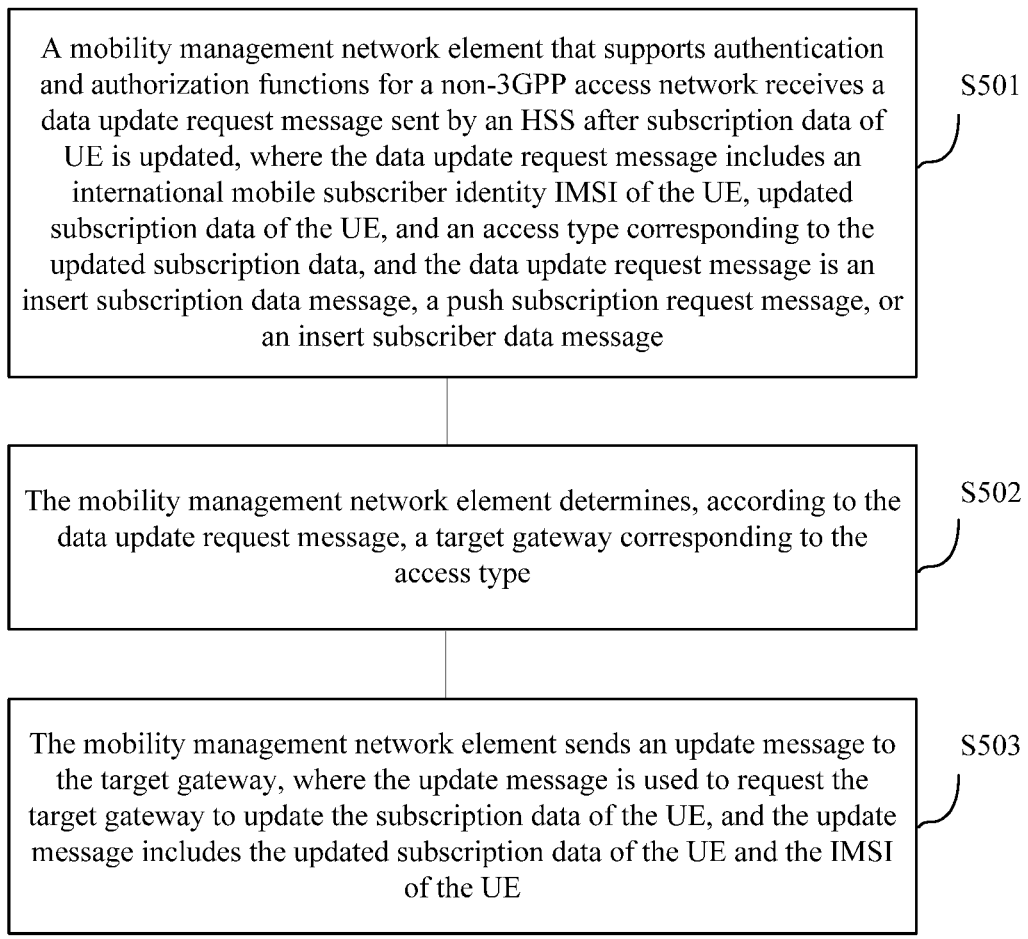
FIG. 5 is a flowchart of a method for updating subscription data according to an embodiment of the present invention.

It should be noted that, the method for updating subscription data according to any one of the embodiments corresponding to FIG. 5 to FIG. 7 may be used in combination with the access method in a wireless communications network in the method embodiment corresponding to FIG. 3 or FIG. 4. Details are not described again herein in this embodiment of the present invention.

Figure 8:
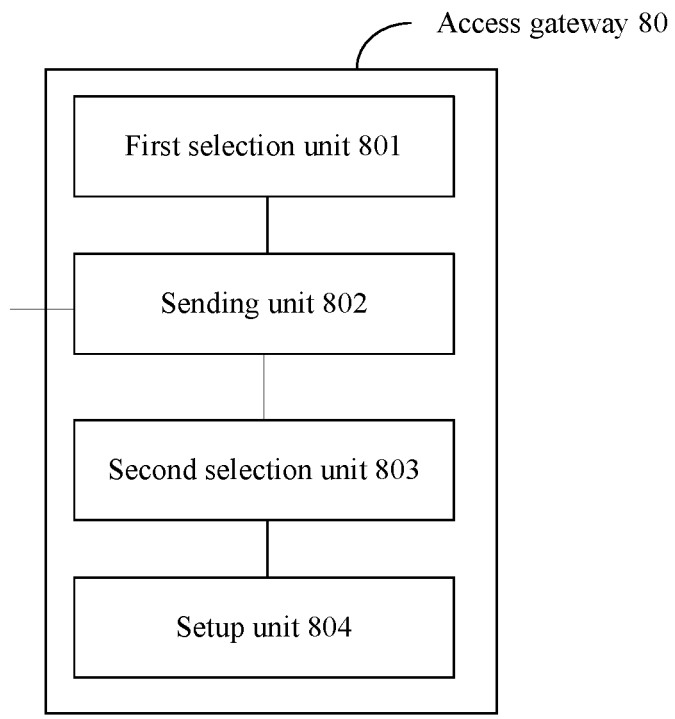
FIG. 8 is a schematic diagram of an access gateway according to an embodiment of the invention.

Corresponding to the access method in a wireless communications network according to the method embodiment in FIG. 3 or FIG. 4, an embodiment of the present invention provides an access gateway 80. As shown in FIG. 8, the access gateway 80 is a non 3rd Generation Partnership Project 3GPP network access gateway, and the access gateway 80 includes a first selection unit 801, a sending unit 802, a second selection unit 803, and a setup unit 804. The access gateway 80 may be the non-3GPP access gateway in the method embodiment corresponding to FIG. 3, or may be the ePDG in the method embodiment corresponding to FIG. 4.

The first selection unit 801 is configured to select, after user equipment UE accesses a non-3GPP access network, a target mobility management network element for the UE, where the target mobility management network element supports authentication and authorization functions for the non-3GPP access network.

The sending unit 802 is configured to send an authentication and authorization request message to the target mobility management network element, where the authentication and authorization request message is used to request to perform authentication and authorization for the UE.

The second selection unit 803 is configured to select a packet data network gateway P-GW for an APN of the UE.

The setup unit 804 is configured to set up a PDN connection between the non-3GPP access gateway and the selected P-GW for the APN of the UE after the target mobility management network element successfully performs authentication and authorization for the UE.

The sending unit 802 is further configured to register an identity of the selected P-GW with a home subscriber server HSS by using the target mobility management network element, for example, send the APN of the UE and the identity of the selected P-GW to the target mobility management network element, so that the target mobility management network element sends the APN of the UE and the identity of the selected P-GW to the HSS by using a notification message or a non-3GPP IP access registration request message.

Optionally, the second selection unit 803 may be further configured to determine an access type of the UE; and the sending unit 802 may specifically send the APN of the UE, the identity of the selected P-GW, and the access type of the UE to the target mobility management network element, so that the target mobility management network element sends the APN of the UE, the identity of the selected P-GW, and the access type of the UE to the HSS by using the notification message or the non-3GPP IP access registration request message.

Optionally, that the first selection unit 801 selects a target mobility management network element for the UE may be: the first selection unit 801 selects the target mobility management network element according to preconfigured information, where the preconfigured information includes a correspondence between location information of the UE and an identity of the target mobility management network element, or the preconfigured information includes a correspondence between an identity of the non-3GPP access gateway and an identity of the target mobility management network element; or the first selection unit 801 sends an international mobile subscriber identity IMSI of the UE to a routing agent node, so that the routing agent node selects the target mobility management network element for the UE according to the IMSI of the UE; or the first selection unit 801 constructs a fully qualified domain name of a mobility management network element according to location information of the UE, sends the fully qualified domain name to a domain name resolution server DNS, receives identities of mobility management network elements determined by the DNS according to the fully qualified domain name, and selects, from the mobility management network elements determined by the DNS, a mobility management network element that supports the authentication and authorization functions for the non-3GPP access network, as the target mobility management network element.

In this embodiment of the present invention, authentication and authorization functions of a 3GPP AAA server for a non-3GPP access network are integrated into a mobility management network element. Therefore, after UE accesses the non-3GPP access network, the first selection unit 801 in the access gateway 80 of the non-3GPP network may select the mobility management network element that supports the authentication and authorization functions for the non-3GPP access network as a target mobility management network element, and the sending unit 802 may request, by using an authentication and authorization request message, the target mobility management network element to perform authentication and authorization for the UE. After authentication and authorization are performed for the UE, the second selection unit 803 may select a P-GW for the UE, and the setup unit 804 sets up a PDN connection between the access gateway and the selected P-GW for the UE. In this way, access of the UE from the non-3GPP access network to an EPC network is implemented.

Figure 9:
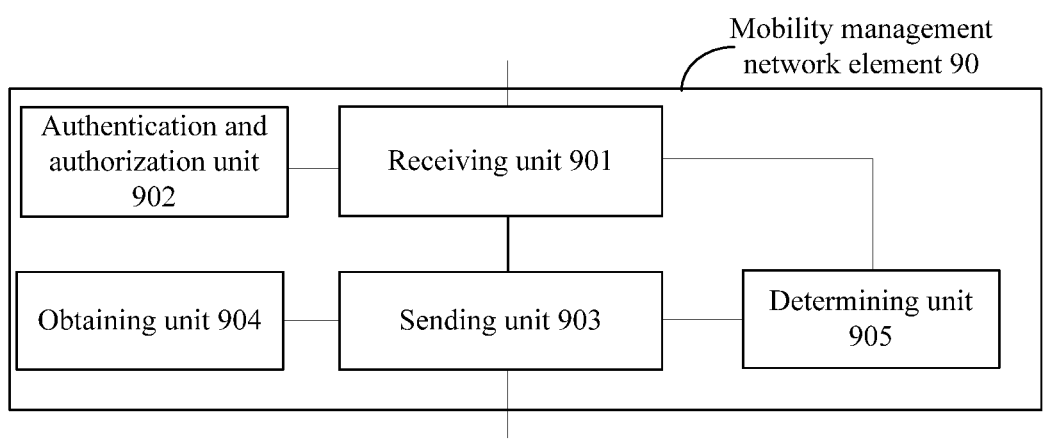
FIG. 9 is a schematic diagram of a mobility management network element according to an embodiment of the present invention.

Corresponding to the access method in a wireless communications network in FIG. 3 or FIG. 4, an embodiment of the present invention provides a mobility management network element 90. As shown in FIG. 9, the mobility management network element 90 supports authentication and authorization functions for a non-3GPP access network, and the mobility management network element 90 includes a receiving unit 901, an authentication and authorization unit 902, and a sending unit 903. The mobility management network element 90 may be the mobility management network element in the method embodiment corresponding to FIG. 3, or may be the MME in the method embodiment corresponding to FIG. 4.

The receiving unit 901 is configured to receive, after user equipment UE accesses the non-3GPP access network, an authentication and authorization request message sent by a non-3GPP access gateway, where the authentication and authorization request message is used to request to perform authentication and authorization for the UE.

The authentication and authorization unit 903 is configured to perform authentication and authorization for the UE according to the authentication and authorization request message.

The receiving unit 901 is further configured to receive, after the authentication and authorization unit successfully performs authentication and authorization for the UE, an access point name APN of the UE and an identity of a packet data network gateway P-GW that are sent by the non-3GPP access gateway, where the P-GW is selected by the non-3GPP access gateway for the APN of the UE.

The sending unit 903 is further configured to send the APN of the UE and the identity of the selected P-GW to the HSS, so that registration of the identity of the P-GW is implemented. Optionally, the sending unit 903 may specifically send the APN of the UE and the identity of the selected P-GW to the HSS by using a notification message or a non-3GPP IP access registration request message.

Optionally, the receiving unit 901 is further configured to receive an authentication response message returned by the HSS, where the authentication response message includes an authentication vector of the UE; and the sending unit 903 is further configured to send an authentication request message to the UE by using the authentication vector of the UE.

Optionally, the mobility management network element 90 may further include:

an obtaining unit 904, configured to determine an access type of the UE, or receive an access type of the UE that is sent by the non-3GPP access gateway; in this case, the sending unit 903 may send the APN of the UE, the identity of the selected P-GW, and the access type of the UE to the HSS by using the notification message or the non-3GPP IP access registration request message. Therefore, the HSS may determine, according to the access type, whether the APN of the UE and the identity of the selected PGW are used for a 3GPP network or a non-3GPP network.

Optionally, the HSS stores subscription data of the UE, and same subscription data may be used for different access technologies. During updating of the subscription data, the HSS needs to update updated subscription data to a corresponding network element. Therefore, the receiving unit 901 may be further configured to receive a data update request message sent by the HSS after subscription data of the UE is updated, where the data update request message includes an international mobile subscriber identity IMSI of the UE and updated subscription data of the UE, and the data update request message is an insert subscription data message, a push subscription request message, or an insert subscriber data message; and the sending unit 903 may be further configured to send, according to the data update request message, a modify bearer command to an S-GW connected to the mobility management network element and a user subscription data update message to all non-3GPP access gateways connected to the mobility management network element, where both the modify bearer command and the user subscription data update message include the updated subscription data of the UE and the IMSI of the UE.

Optionally, different subscription data may be used for different access technologies, and during updating of subscription data, the HSS needs to update updated subscription data to a corresponding network element. The receiving unit 901 may be further configured to receive a data update request message sent by the HSS after subscription data of the UE is updated, where the data update request message includes an international mobile subscriber identity IMSI of the UE, updated subscription data of the UE, and an access type corresponding to the updated subscription data, and the data update request message is an insert subscription data message, a push subscription request message, or an insert subscriber data message; the mobility management network element may further include a determining unit 905, configured to determine, according to the data update request message, a target gateway corresponding to the access type; and the sending unit 903 may further send an update message to the target gateway, where the update message is used to request the target gateway to update the subscription data of the UE, and the update message includes the updated subscription data of the UE and the IMSI of the UE.

In this embodiment of the present invention, authentication and authorization functions of a 3GPP AAA server for a non-3GPP access network are integrated into the mobility management network element 90. Therefore, after UE accesses the non-3GPP access network, a non-3GPP access gateway may select the mobility management network element 90 that supports the authentication and authorization functions for the non-3GPP access network as a target mobility management network element; the receiving unit 901 of the mobility management network element 90 may receive an authentication and authorization request message sent by the non-3GPP access gateway, the sending unit 903 may initiate an authentication procedure to the UE by using an authentication vector of the UE; the receiving unit 901 may further receive an access point name APN of the UE and an identity of a P-GW that are sent by the non-3GPP access gateway, where the P-GW is selected by the non-3GPP access gateway for the APN of the UE; and the sending unit 903 is further configured to send the APN of the UE and the identity of the selected P-GW to the HSS. In this way, access of the UE from the non-3GPP access network to an EPC network is implemented.

Figure 10:
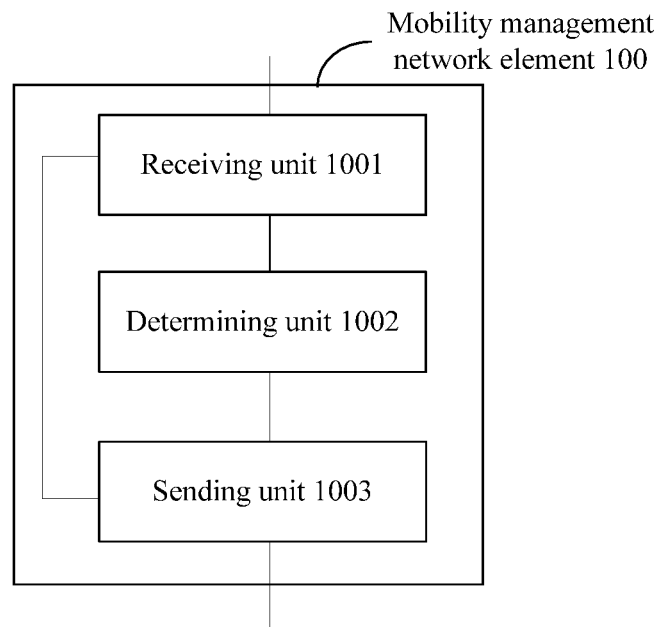
FIG. 10 is a schematic diagram of another mobility management network element according to an embodiment of the present invention.

Corresponding to the method for updating subscription data in FIG. 5 or FIG. 6, an embodiment of the present invention provides a mobility management network element 100. As shown in FIG. 10, the mobility management network element 100 includes a receiving unit 1001, a determining unit 1002, and a sending unit 1003. The mobility management network element 100 may be the mobility management network element in the method embodiment corresponding to FIG. 5, or may be the MME in the method embodiment corresponding to FIG. 6.

The receiving unit 1001 is configured to receive a data update request message sent by an HSS after subscription data of UE is updated, where the data update request message includes an IMSI of the UE, updated subscription data of the UE, and an access type corresponding to the updated subscription data, and the data update request message is an insert subscription data message, a push subscription request message, or an insert subscriber data message.

The determining unit 1002 is configured to determine, according to the data update request message, a target gateway corresponding to the access type.

The sending unit 1003 is configured to send an update message to the target gateway, where the update message is used to request the target gateway to update the subscription data of the UE, and the update message includes the updated subscription data of the UE and the IMSI of the UE.

Optionally, when the access type belongs to a non 3rd Generation Partnership Project 3GPP access technology, the target gateway is an ePDG, a trusted wireless local area network access network TWAN, or a high rate packet data serving gateway HSGW, and the update message sent by the mobility management network element to the target gateway is a user subscription data update message; or when the access type belongs to a 3GPP access technology, the target gateway is an S-GW, and the update message sent by the mobility management network element to the target gateway is a modify bearer command.

Optionally, the sending unit 1003 is further configured to send a data update response message to the HSS, where the data update response message includes the access type, and the data update response message is an insert subscription data response message, a push subscription response message, or an insert subscriber data response message.

In this embodiment of the present invention, the determining unit 1002 may determine a target gateway according to an access type corresponding to updated subscription data of the UE, so that the sending unit 1003 can update the updated subscription data of the UE to the target gateway and update the updated subscription data of the UE to a P-GW through the target gateway. In this way, updating of user subscription data is implemented, and normal use of the subscription data of the UE is ensured.

Figure 11:
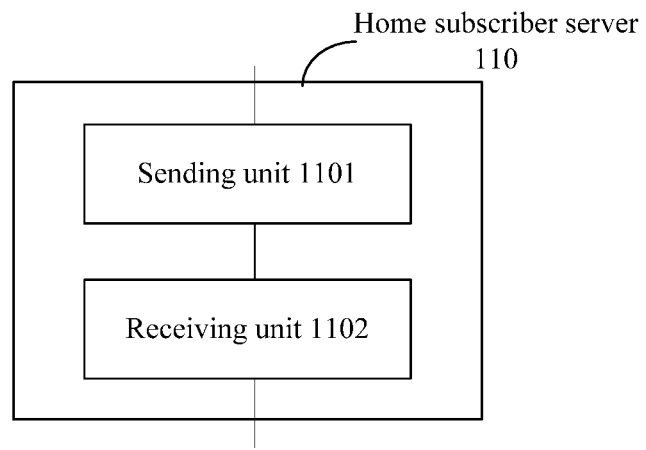
FIG. 11 is a schematic diagram of a home subscriber server according to an embodiment of the present invention.

Corresponding to the method for updating subscription data in FIG. 5 or FIG. 6, an embodiment of the present invention provides a home subscriber server 110. As shown in FIG. 11, the home subscriber server 110 includes a sending unit 1101. The home subscriber server 110 may be the HSS in the method embodiment corresponding to FIG. 5, or may be the HSS in the method embodiment corresponding to FIG. 6.

The sending unit 1101 is configured to send a data update request message to a mobility management network element after subscription data of user equipment UE is updated, where the data update request message includes an international mobile subscriber identity IMSI of the UE, updated subscription data of the UE, and an access type corresponding to the updated subscription data, so that the mobility management network element determines, according to the data update request message, a target gateway corresponding to the access type, and sends an update message to the target gateway, where the update message is used to request the target gateway to update the subscription data of the UE, and the update message includes the updated subscription data of the UE and the IMSI of the UE. The data update request message is an insert subscription data message, a push subscription request message, or an insert subscriber data message.

Optionally, when the access type belongs to a non 3rd Generation Partnership Project 3GPP access technology, the target gateway is an ePDG, a trusted wireless local area network access network TWAN, or a high rate packet data serving gateway HSGW, and the update message sent by the mobility management network element to the target gateway is a user subscription data update message; or when the access type belongs to a 3GPP access technology, the target gateway is an S-GW, and the update message sent by the mobility management network element to the target gateway is a modify bearer command.

Optionally, the home subscriber server may further include:

a receiving unit 1102, configured to receive a data update response message sent by the mobility management network element, where the data update response message includes the access type, and the data update response message is an insert subscription data response message, a push subscription response message, or an insert subscriber data response message.

In this embodiment of the present invention, after subscription data of UE is updated, the sending unit 1101 may send an international mobile subscriber identity IMSI of the UE, updated subscription data of the UE, and an access type corresponding to the updated subscription data to a mobility management network element, so that the mobility management network element can determine a target gateway according to the access type corresponding to the updated subscription data of the UE. In this way, the updated subscription data of the UE is updated to the target gateway, and the updated subscription data of the UE is updated to a P-GW through the target gateway. Further, updating of user subscription data is implemented, and normal use of the subscription data of the UE is ensured.

Figure 12:
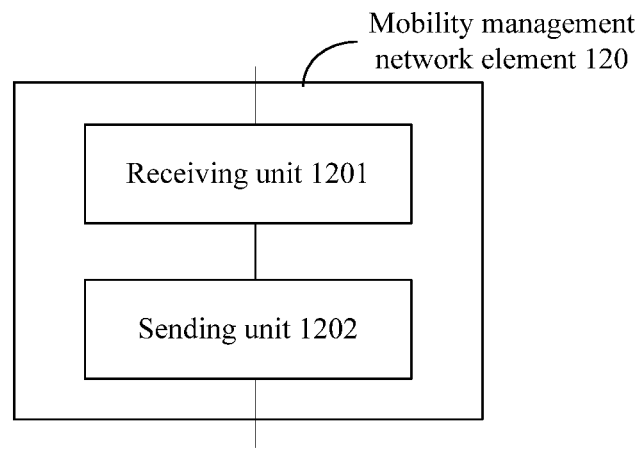
FIG. 12 is a schematic diagram of another mobility management network element according to an embodiment of the present invention.

Corresponding to the method for updating subscription data in FIG. 7, an embodiment of the present invention provides a mobility management network element 120. As shown in FIG. 12, the mobility management network element 120 supports authentication and authorization functions for a non-3GPP access network, and the mobility management network element 120 includes a receiving unit 1201 and a sending unit 1202. The mobility management network element 120 may be the mobility management network element in the method embodiment corresponding to FIG. 7.

The receiving unit 1201 is configured to receive a data update request message sent by a home subscriber server HSS after subscription data of user equipment UE is updated, where the data update request message includes an international mobile subscriber identity IMSI of the UE and updated subscription data of the UE, and the data update request message is an insert subscription data message, a push subscription request message, or an insert subscriber data message.

The sending unit 1202 is configured to send, according to the data update request message, a modify bearer command to an S-GW connected to the mobility management network element and a user subscription data update message to all non-3GPP access gateways connected to the mobility management network element, where both the modify bearer command and the user subscription data update message include the updated subscription data of the UE and the IMSI of the UE.

In this embodiment of the present invention, in an integrated architecture, the mobility management network element 120 supports authentication and authorization functions for a non-3GPP access network. Therefore, when subscription data is updated, an HSS may send the subscription data only to the mobility management network element 120, and the sending unit 1202 of the mobility management network element 120 sends the subscription data to an S-GW and all non-3GPP access gateways. Therefore, the S-GW and the non-3GPP access gateways may update the updated subscription data to a corresponding P-GW, and updating of the subscription data is implemented.

Figure 13:
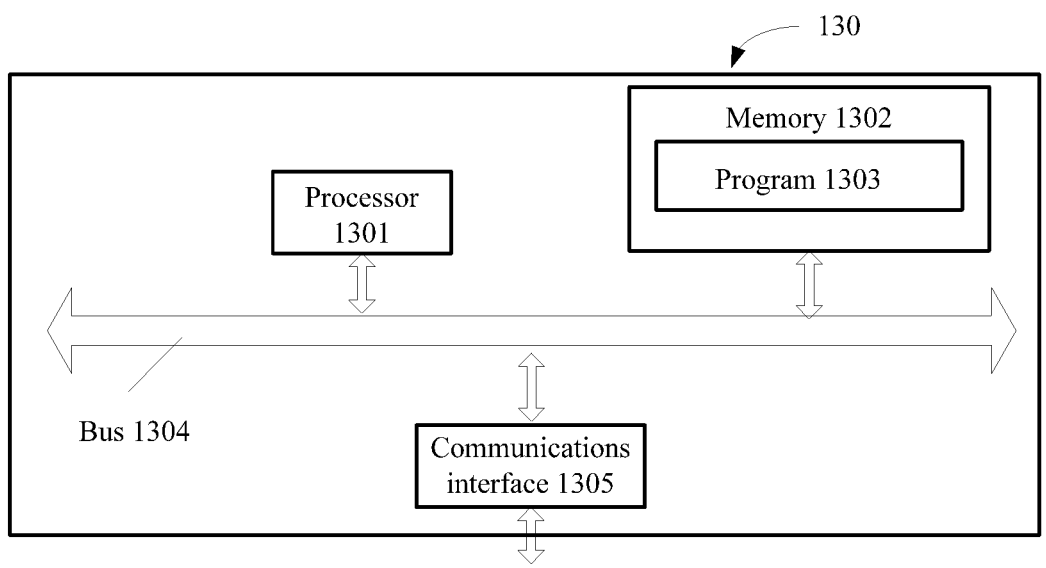
FIG. 13 is a schematic structural diagram of a computer processing apparatus according to an embodiment of the present invention.

As shown in FIG. 13, an embodiment of the present invention provides a computer processing apparatus. The apparatus may include:

a processor 1301, a memory 1302, a bus 1304, and a communications interface 1305, where the processor 1301, the memory 1302, and the communications interface 1305 are connected by the bus 1304 and implement mutual communication.

The processor 1301 may be a single-core or multi-core central processing unit, or a specific integrated circuit, or one or more integrated circuits configured to implement an embodiment of the present invention.

The memory 1302 may be a high-speed RAM memory, or may be a non-volatile memory (non-volatile memory), for example, at least one disk storage.

The memory 1302 is configured to store a computer-executable instruction 1303. Specifically, the computer-executable instruction 1303 may include program code.

When the apparatus runs, the processor 1301 runs the computer-executable instruction 1303, and may perform the method procedure in the method embodiment corresponding to any one of FIG. 3 to FIG. 7. When the access method in a wireless communications network in FIG. 3 or FIG. 4 is performed, the apparatus may be a non-3GPP access gateway (such as an ePDG or a TWAN or an HSGW) or a mobility management network element (such as an MME or an SGSN). When the method for updating subscription data in FIG. 5 or FIG. 6 is performed, the apparatus may be a mobility management network element (such as an MME or an SGSN) or an HSS. When the method for updating subscription data in FIG. 6 is performed, the apparatus may be a mobility management network element (such as an MME or an SGSN).

An embodiment of the present invention provides a computer-readable medium, including a computer-executable instruction, so that when a processor of a computer executes the computer-executable instruction, the computer performs the access method in a wireless communications network in FIG. 3 or FIG. 4.

An embodiment of the present invention provides a computer-readable medium, including a computer-executable instruction, so that when a processor of a computer executes the computer-executable instruction, the computer performs the access method in a wireless communications network in any one of FIG. 5 to FIG. 7.

An embodiment of the present invention provides an access system. The system includes an access gateway 80 and a mobility management network element 90. For actions performed respectively by the access gateway 80 and the mobility management network element 90 and interaction between the access gateway 80 and the mobility management network element 90, refer to descriptions in the method embodiments corresponding to FIG. 3 and FIG. 4, or refer to descriptions in the apparatus embodiments corresponding to FIG. 8 and FIG. 9.

An embodiment of the present invention provides an access system. The system includes a mobility management network element 100 and a home subscriber server 110. For actions performed respectively by the mobility management network element 100 and the home subscriber server 110 and interaction between the mobility management network element 100 and the home subscriber server 110, refer to descriptions in the method embodiments corresponding to FIG. 5 and FIG. 6, or refer to descriptions in the apparatus embodiments corresponding to FIG. 10 and FIG. 11.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An access method in a wireless communications network, comprising:

after a user equipment (UE) accesses a non 3rd Generation Partnership Project (3GPP) access network, selecting, by a non-3GPP access gateway, a target mobility management network element for the UE, wherein the target mobility management network element supports authentication and authorization functions for the non-3GPP access network;

sending, by the non-3GPP access gateway, an authentication and authorization request message to the target mobility management network element, wherein the authentication and authorization request message is used to request to perform authentication and authorization for the UE;

after the target mobility management network element successfully performs authentication and authorization for the UE, selecting, by the non-3GPP access gateway, a packet data network gateway (P-GW) for an access point name (APN) of the UE;

setting up, by the non-3GPP access gateway, a packet data network (PDN) connection between the non-3GPP access gateway and the selected P-GW for the APN of the UE; and registering, by the non-3GPP access gateway, an identity of the selected P-GW with a home subscriber server (HSS) by using the target mobility management network element.

2. The method according to claim 1, wherein the registering, by the non-3GPP access gateway by using the target mobility management network element, an identity of the selected P-GW with an HSS comprises:

sending, by the non-3GPP access gateway, the APN of the UE and the identity of the selected P-GW to the target mobility management network element, so that the target mobility management network element sends the APN of the UE and the identity of the selected P-GW to the HSS by using a notification message or a non-3GPP Internet Protocol IP access registration request message.

3. The method according to claim 2, wherein the method further comprises:

determining, by the non-3GPP access gateway, an access type of the UE; and the sending, by the non-3GPP access gateway, the APN of the UE and the identity of the selected P-GW to the target mobility management network element, so that the target mobility management network element sends the APN of the UE and the identity of the selected P-GW to the HSS by using a notification message or a non-3GPP IP access registration request message, comprises:

sending, by the non-3GPP access gateway, the APN of the UE, the identity of the selected P-GW, and the access type of the UE to the target mobility management network element, so that the target mobility management network element sends the APN of the UE, the identity of the selected P-GW, and the access type of the UE to the HSS by using the notification message or the non-3GPP IP access registration request message.

4. An access method in a wireless communications network, comprising:
- after user equipment (UE) accesses a non 3rd Generation Partnership Project (3GPP) access network, receiving, by a mobility management network element that supports authentication and authorization functions for the non-3GPP access network, an authentication and authorization request message sent by a non-3GPP access gateway, wherein the authentication and authorization request message is used to request to perform authentication and authorization for the UE;
- performing, by the mobility management network element, authentication and authorization for the UE according to the authentication and authorization request message;
- after successfully performing authentication and authorization for the UE, receiving, by the mobility management network element, an access point name (ANP) of the UE and an identity of a packet data network gateway (P-GW) that are sent by the non-3GPP access gateway, wherein the P-GW is selected by the non-3GPP access gateway for the APN of the UE; and
- sending, by the mobility management network element, the APN of the UE and the identity of the selected P-GW to a home subscriber server (HSS).

5. The method according to claim 4, wherein the sending, by the mobility management network element, the APN of the UE and the identity of the selected P-GW to the HSS comprises:
- sending, by the mobility management network element, the APN of the UE and the identity of the selected P-GW to the HSS by using a notification message or a non-3GPP IP access registration request message.

6. The method according to claim 5, wherein the method further comprises:
- determining, by the mobility management network element, an access type of the UE, or receiving an access type of the UE that is sent by the non-3GPP access gateway; and
- the sending, by the mobility management network element, the APN of the UE and the identity of the selected P-GW to the HSS by using a notification message or a non-3GPP Internet Protocol IP access registration request message comprises:
- sending, by the mobility management network element, the APN of the UE, the identity of the selected P-GW, and the access type of the UE to the HSS by using the notification message or the non-3GPP IP access registration request message.

7. A method for a mobility management network element to support authentication and authorization functions, comprising:
- after user equipment (UE) accesses a non 3rd Generation Partnership Project (3GPP) access network, receiving, by the mobility management network element, an authentication and authorization request message sent by a non-3GPP access gateway, to support by the mobility management network element the authentication and authorization functions for the non-3GPP access network, wherein the authentication and authorization request message is used to request to perform authentication and authorization for the UE;
- performing, by the mobility management network element, authentication and authorization for the UE according to the authentication and authorization request message;
- after successfully performing authentication and authorization for the UE, receiving, by the mobility management network element, an access point name (ANP) of the UE and an identity of a packet data network gateway (P-GW) that are sent by the non-3GPP access gateway, wherein the P-GW is selected by the non-3GPP access gateway for the APN of the UE;
- sending, by the mobility management network element, the APN of the UE and the identity of the selected P-GW to a home subscriber server (HSS);
- receiving, by the mobility management network element, a data update request message sent by HSS after subscription data of the UE is updated, wherein the data update request message comprises an international mobile subscriber identity (IMSI) of the UE, updated subscription data of the UE, and an access type corresponding to the updated subscription data, and the data update request message is an insert subscription data message, a push subscription request message, or an insert subscriber data message;
- determining, by the mobility management network element according to the data update request message, a target gateway corresponding to the access type; and
- sending, by the mobility management network element, an update message to the target gateway, wherein the update message is used to request the target gateway to update the subscription data of the UE, and the update message comprises the updated subscription data of the UE and the IMSI of the UE.

8. The method according to claim 7, wherein when the access type belongs to a non 3rd Generation Partnership Project (3GPP) access technology, the target gateway is an evolved packet data gateway (ePDG), a trusted wireless local area network access network (TWAN), or a high rate packet data serving gateway (HSGW), and the update message sent by the mobility management network element to the target gateway is a user subscription data update message; or
- when the access type belongs to a 3GPP access technology, the target gateway is an S-GW, and the update message sent by the mobility management network element to the target gateway is a modify bearer command.

9. The method according to claim 7, wherein the method further comprises:
- sending, by the mobility management network element, a data update response message to the HSS, wherein the data update response message comprises the access type, and the data update response message is an insert subscription data response message, a push subscription response message, or an insert subscriber data response message.

* * * * *